Patented Sept. 8, 1925.

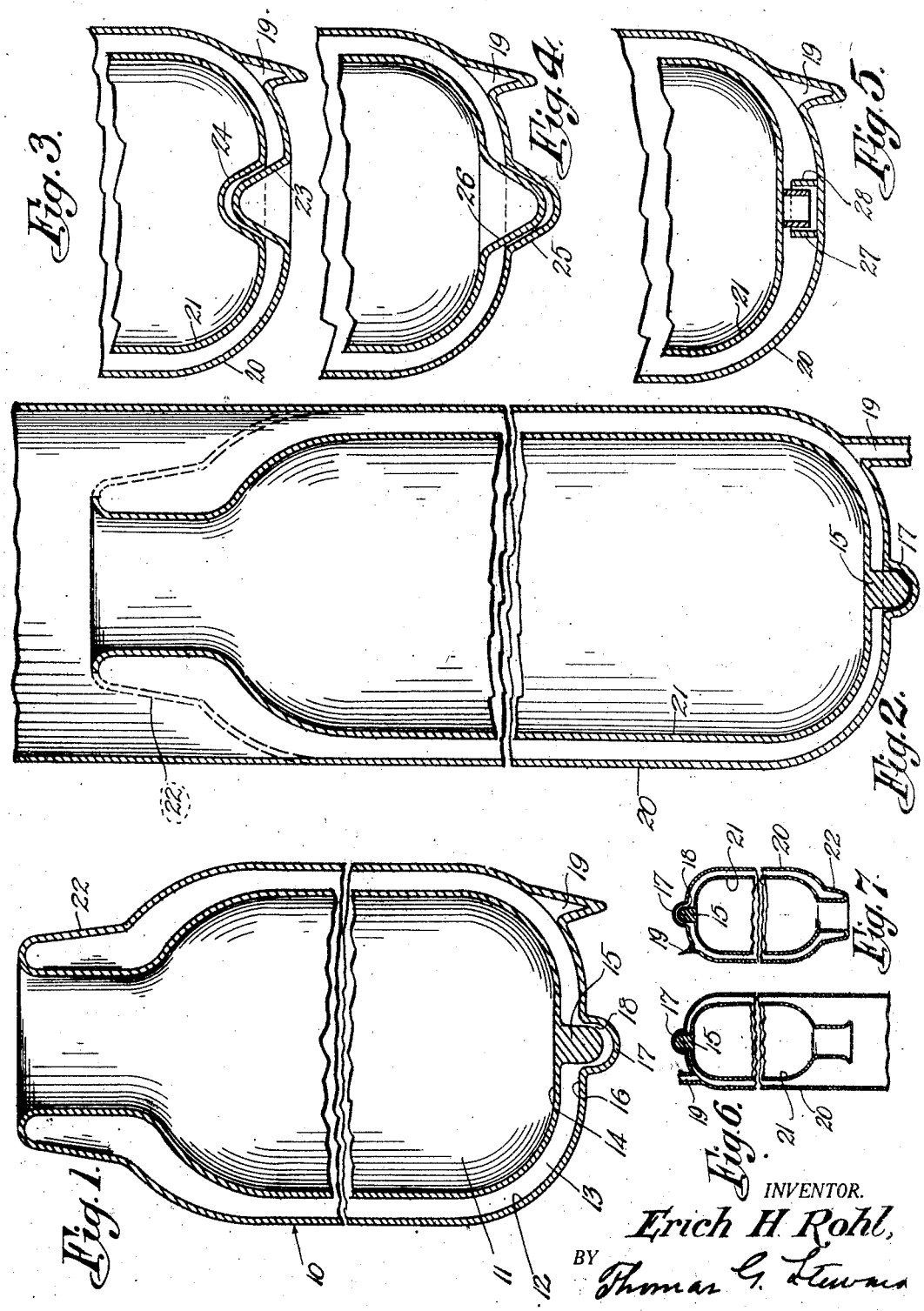

1,552,956

UNITED STATES PATENT OFFICE.

ERICH H. ROHL, OF CHICAGO, ILLINOIS, ASSIGNOR TO THE MANTLE LAMP COMPANY OF AMERICA, OF CHICAGO, ILLINOIS, A CORPORATION.

INSULATED VESSEL.

Application filed March 19, 1924. Serial No. 700,401.

*To all whom it may concern:*

Be it known that ERICH H. ROHL, a citizen of the Republic of Germany, residing at Chicago, in the county of Cook and State of Illinois, has invented certain new and useful Improvements in Insulated Vessels, of which the following is a specification.

The invention relates to heat-insulated vessels, and is especially applicable to the kind which comprises double walls of glass that are united at the mouth of the vessel to hermetically seal the non-heat-conducting space disposed between said walls.

Although vessels of this type have been rendered reasonably efficient as non-conductors of heat by the exhaustion of air from between the walls thereof, it has been found that the spacing devices employed to prevent undue movements of the inner container have afforded paths of heat conductivity which impaired the efficiency of the heat insulation. A further difficulty appeared in the lack of continuity of the silvering which could not be applied to the surfaces with which the spacing devices are in contact, the silvering being employed to prevent radiation of heat through the walls of the vessels. Also, the spacing devices could be seen at the points of contact, and the beauty of the finished vessels was thereby marred.

These difficulties are overcome by the present invention which embodies spacing means for the walls of a glass heat-insulated vessel which is not only an integral feature of one or more than one of the essential parts of the vessel, but is so constructed that the inner and the outer wall of said vessel are normally out of contact at all points excepting the place of union at their necks. Consequently, substances placed in the inner container of the vessel may be kept hot or cold for long periods of time. Furthermore, the elimination of separate insulating elements reduces the cost of materials, while the labor required in installing these elements is dispensed with.

The invention will be well understood if reference be made to the accompanying drawing, in which—

Figure 1 is a vertical sectional and fragmental view of an insulated vessel embodying the invention;

Figure 2 is a similar view showing the separate blanks;

Figures 3, 4 and 5 show modifications of the spacing means, and

Figures 6 and 7 reveal, on a smaller scale, the method of manufacture.

The vessel generally designated by 10 is primarily intended for the storing of food or liquids for the purpose of maintaining the same at practically constant temperature for a considerable length of time. The vessel comprises an inner container 11 and an outer container 12 defining therebetween an interspace 13 of rarified air as will be readily understood by those versed in the art.

The inner container 11 has formed at the bottom 14 and depending therefrom a protuberance or plug 15 which is arranged co-axial with the container and is formed integral with the bottom and originates from the outer surface thereof. Attention is called to the fact that the inner surface of the inner container is not in any manner changed or influenced by the presence of the plug 15 but its continuity, smoothness and uniformity is the same as if the plug were absent. The outer container 12 is equipped at its bottom 16 with a depression or socket 17 also arranged co-axial with the container and of a size to loosely receive the lower end of the plug so that with the containers arranged in functional position, as shown in Figure 1, there is a slight clearance 18 between the plug and socket. Thus throughout the interspace 13 there is no actual contact between the containers.

The provision of a single plug and socket at the longitudinal axis of the containers has many advantages not only as far as the efficiency of the vessel is concerned but is of tremendous importance in the manufacturing thereof as will be hereinafter further referred to.

The outer container is formed with the usual tip 19 through which the air in the space 13 is exhausted, which subsequent to the exhaustion of air is sealed.

In constructing the vessel two blank containers are employed of the forms shown in Figure 2. The outer blank designated 20 is already formed with the depression 17 and the inner blank designated 21 has essentially the shape which it possesses when the vessel is completed.

In assembling the two blanks 20 and 21 they are arranged in inverted position as will be seen from Figures 6 and 7, the container 20 being arranged in a suitable chuck (not shown) and the inner container 21 being inserted into the outer container as appears from Figure 6. The insertion is continued until the plug 15 enters the depression 17 and upon physical contact of these parts indicated by a click they are supported in such position for completion of the vessel. Thereupon the outer container is subjected to a welding heat and by a single draw a union is obtained at the mouth of the vessel with the inner container as will readily appear from Figures 1 and 7. Due to the temperature conditions which prevail during the union of the two containers 20 and 21 and the subsequent cooling a contraction will take place whereby in the finished form the projection 15 will not be in contact with the depression 17 and thus leave the clearance 18.

From the foregoing it follows that the vacuum space 13 is continuous throughout the vessel and that at no point is there an actual contact between the inner and the outer container except of course at the mouth where the union is established. The finished vessel consequently is composed of two walls and the inner wall enters with the projection 15 into the depression 17 without, however, contacting with the latter so that the inner container has a slight pendulous movement under the influence of external shocks. Should the pendulous movement become excessive, the contact between the parts 15 and 17 prevents such movement and precludes actual breakage of the vessel.

Furthermore the absence of contact between the inner and the outer wall as indicated hereinabove prevents heat conduction and consequently increases the efficiency of the device. Furthermore the continuity of the interspace 13 affords the opportunity of completely silvering the surfaces of said space which is an advantageous feature because it improves the appearance of the vessel.

Attention is called to the fact that in uniting the outer container with the inner container the neck of the outer container is formed so that it slightly tapers with the diameter increasing from the mouth toward the body of the container as indicated at 22.

The modification shown in Figure 3 includes two upstanding and hollow centering lugs 23, 24, which are, respectively, parts of each blank, while that shown in Figure 4 has these lugs marked 25, 26, reversed.

In Figure 5, the centering devices 27, 28, are short telescoping cylinders extending from the bottom of the blanks and melted thereto.

Having thus described my invention, what I claim is:

1. An insulated vessel comprising two walls having a vacuum space between them, the walls being joined at the mouth, and a single means for centering said walls and permitting limited lateral motion of the inner wall.

2. An insulated vessel comprising two walls secured together at the mouth and having a vacuum space between them, and a single means integral with said walls for centering said walls and permitting limited lateral motion of the inner wall.

3. An insulated vessel comprising double walls integrally connected at the mouth, said walls defining a space of rarefied air, and a single means for limiting relative motions of said walls but permitting access to the entire surface of the walls within the space of rarefied air.

4. An insulated vessel comprising two containers in telescoping arrangement and having a vacuum space between them, the containers being joined at the mouths and being free from contact otherwise, and a single means co-axially disposed for centering said containers and limiting relative motions thereof.

5. An insulated vessel comprising double walls integrally connected at the mouths, said walls having slight relative motions at their bases, and means co-axial with said walls for centering said walls and limiting relative motions thereof.

6. An insulated vessel comprising two walls having a vacuum space between them, the walls being joined at the mouth by a vitreous bond and formed at their bases to be normally free from contact with each other, but establishing contact when the walls have relative motions of a predetermined degree.

7. An insulated vessel comprising an inner part and an outer part joined together at the mouth, and means formed on the base of the outer part to permit restricted lateral motion of the base of the inner part.

8. An insulated vessel comprising an inner part and an outer part joined together at the mouth, and integral means formed on the base of the outer part to permit restricted lateral motion of the base of the inner part.

9. An insulated vessel comprising an inner wall and an outer wall joined together at the mouth, and a single means for permitting slight pendular movement of the inner wall without contact with the outer wall, but establishing such contact upon excessive movement.

10. A receptacle comprising an inner and an outer wall with a vacuum therebetween, and a single centering and spacing means between said walls permitting slight relative movements of said walls without contact thereof, but establishing contact upon excessive movements.

11. A receptacle comprising an inner and an outer wall with a vacuum therebetween, and a single spacing and centering means between said walls enabling a silvering solution to reach every portion of said walls.

12. A receptacle comprising an inner and an outer wall, said walls being secured together at one end and free to have relative movements at the other end, there being a vacuum between said walls, and spacing means between said walls normally providing a clearance between said walls and out of contact therewith.

13. A receptacle comprising an inner and an outer wall, said walls being secured together at one end and having relative movements at the other end, and centering and spacing means provided in said vacuum space on the inner and the outer wall and normally out of contact with said walls.

14. A receptacle comprising an inner and an outer wall, said walls being secured together at one end and having relative movements at the other end, there being a vacuum between said walls, and a single means for centering the inner wall with respect to the outer wall, but normally out of contact with said walls to prevent heat conduction.

15. A receptacle comprising an inner wall and an outer wall defining a vacuum therebetween, said walls being secured together at one end and having relative movements at the other end, and a spacing and centering device in said vacuum space normally leaving a clearance between the inner and the outer wall and out of contact therewith.

16. A receptacle comprising an inner and an outer wall, defining a vacuum space therebetween, said walls being secured together at the mouth, and a single spacing and centering device in said vacuum space normally out of contact with the inner and outer walls and permitting a pendular movement of the inner wall of a limited nature.

17. A vessel comprising double walls having a vacuum space between them, the walls being joined at the mouth but otherwise entirely free from contact, and a plug and socket connection between said walls normally maintaining a clearance therebetween.

18. A vessel comprising double walls having a vacuum space therebetween, the walls being joined at the mouth but otherwise entirely free from contact, and a connection between the bases of said walls permitting slight lateral play of said walls.

19. An insulated vessel comprising two walls having a vacuum space between them, the walls being joined at the mouth, a socket formed in the outer wall, and a protuberance from the inner wall loosely extending into said socket.

20. An insulated vessel comprising two walls having a vacuum space between them, the walls being joined at the mouth, the outer wall being formed with a depression, and a protuberance integral with the inner wall loosely received in said depression.

21. An insulated vessel comprising two walls having a vacuum space between them, the walls being joined at the mouth, the outer wall being formed with a depression, and a protuberance integral with the inner wall and originating at the outer surface thereof, loosely received in said depression.

22. An insulated vessel comprising two walls having a vacuum space between them, the walls being joined at the mouth, the outer wall being formed with a depression in the base thereof, and a projection on the base of the inner wall and loosely entering said depression.

23. An insulated vessel comprising two walls having a vacuum space between them, the walls being joined at the mouth, the outer wall being formed with a depression in the base thereof and co-axial with the vessel, and a plug integral with the base of the inner wall and loosely entering the depression but devoid of contact therein.

24. A vessel comprising an inner and an outer container, and means for automatically centering said containers upon insertion of the inner into the outer container, but permitting limited lateral motion of said inner container.

25. A vessel comprising an inner and an outer container, and means integral with said containers for automatically centering the same upon telescoping arrangement of said containers, but permitting lateral motion of said inner container.

26. A double-walled glass heat container having the concentric tops of its walls united, and including means for permitting and restricting oscillations of the inner wall, said means being so constructed that normally the union constitutes the only direct path of heat conductivity between the walls of said container.

27. An insulated vessel of frangible character including outer and inner walls hermetically joined at one end and closed at their other ends so as to leave a space between said walls for the formation of a vacuum, and means for centering said walls including one part which is normally spaced from an adjacent part but is so disposed as to prevent substantial relative movements of the free ends of said walls.

28. An insulated vessel of frangible character including walls having contact only at their necks whereby the entire proximate surfaces of said walls may be silvered, and means comprising non-contacting parts for preventing substantial relative movements of the free ends of said walls.

29. A heat-insulated receptacle having an inner container and an outer jacket united at their concentric tops, and including means for restricting oscillations of said inner container relatively to said outer jacket, said means being so constructed that it establishes a gap and thus affords no path of heat conductivity when said container is in an upright position.

In testimony whereof I affix my signature.

ERICH H. ROHL.